T. C. MORRIS.
DUST PAN.
APPLICATION FILED NOV. 30, 1909.
979,784.
Patented Dec. 27, 1910.
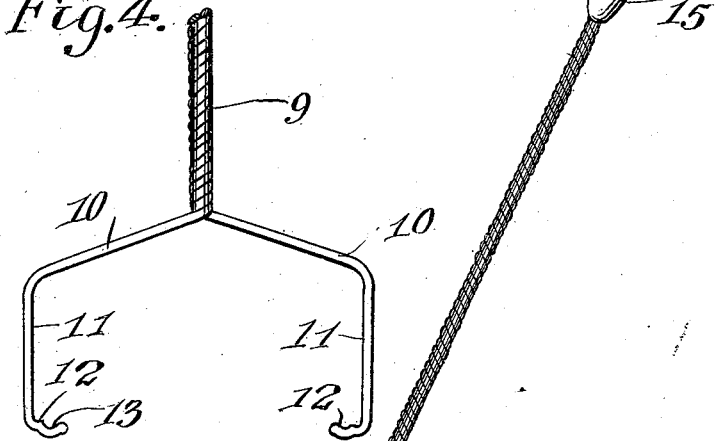
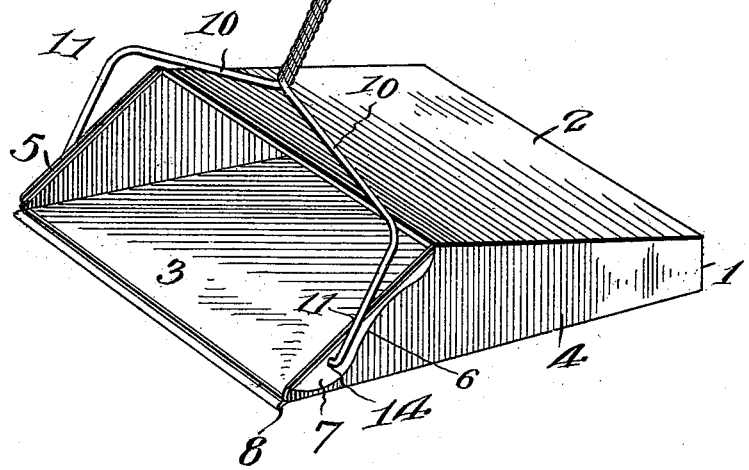
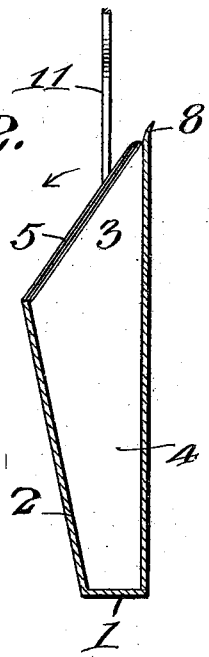
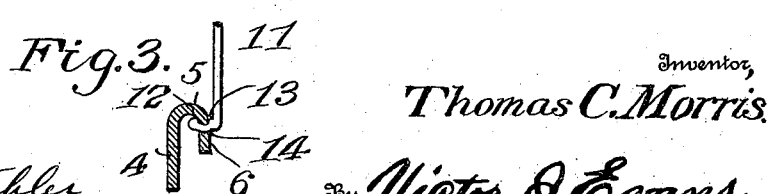
Inventor,
Thomas C. Morris.
By Victor J. Evans
Attorney
Witnesses:
Joe. P. Wahler
D. W. Gould.

UNITED STATES PATENT OFFICE.

THOMAS C. MORRIS, OF LOCKPORT, NEW YORK.

DUST-PAN.

979,784.     Specification of Letters Patent.     Patented Dec. 27, 1910.

Application filed November 30, 1909. Serial No. 530,615.

*To all whom it may concern:*

Be it known that I, THOMAS C. MORRIS, a citizen of the United States, residing at Lockport, in the county of Niagara and State of New York, have invented new and useful Improvements in Dust-Pans, of which the following is a specification.

The invention relates to an improvement in dust pans, and is particularly directed to a dust pan which may be conveniently handled without stooping and positioned as accurately and as readily as the ordinary device of this character.

The main object of the present invention is the provision of a dust pan including a practically inclosed receptacle and a handle movably connected thereto, the connection of the handle with the receptacle being such as to preclude the projection of any portion of the handle within the refuse receiving space of the receptacle.

Another object of the invention is the provision of a dust pan in which the receptacle is formed to permit convenient dumping of its contents while at the same time protecting the person against the rising dust incident to the dumping operation.

The invention will be described in the following specification, reference being had particularly to the accompanying drawing, in which:—

Figure 1 is a perspective view of my improved dust pan. Fig. 2 is a vertical sectional view of the same with the upper portion of the handle omitted, showing the parts in the position occupied when the dust pan is not in use. Fig. 3 is a broken detail part in section and part in elevation, illustrating the connection between the handle and receptacle. Fig. 4 is a broken elevation of the handle.

Referring particularly to the accompanying drawing, my improved dust pan comprises a receptacle 1, which is in the form of a box-like body having the upper wall 2 at an angle to the lower wall 3 and of less length than the lower wall. The inclination of the upper wall is in an upward direction from the rear wall of the receptacle, so that at its forward end the receptacle is of greater height than at the rear end. By virtue of the difference in length of the upper and lower walls the side walls 4 of the receptacle have their forward edges 5 inclined rearwardly and upwardly as respects the vertical. In the form of the device illustrated the forward edges of the side walls are formed with outwardly turned lips 6, which are arranged in spaced parallel relation to the side walls, being preferably of greatest width adjacent the lower edges of the side walls, as at 7. The extreme forward edge of the lower wall 3 is formed to provide a slightly downwardly turned directing lip 8 so shaped at its extreme forward edge as to insure close contact with a plane surface to permit convenient sweeping of the refuse within the receptacle.

The handle 9 is formed of two strands of wire or similar material, which for the greater portion of their length are intertwisted to provide the hand engaging portion. Below the intertwisted portion the strands of the handle are bent in opposite directions, as at 10, for a length slightly exceeding the width of the receptacle 1. From the ends of the laterally projecting portions 10 the wire strands are bent to provide arms 11, which extend in parallel relation with each other and with the intertwisted portion of the handle. At the lower ends of the arms the terminal ends of the strands are bent laterally and inwardly to provide pivot portions 12, which, adjacent their inner ends, are recessed or formed to provide rounded depressions 13. The widened portions of the lips 6 of the receptacle are formed with openings 14 to receive the pivot portions 12 of the handle, the depressions 13 engaging the walls of the openings 14 as clearly shown in Fig. 3. By virtue of the depressions the pivot portions of the handle when sprung in place are prevented from accidental displacement, as will be clearly apparent from Fig. 3 of the drawings. The handle 9 is preferably of a length to permit the convenient use of the dust pan without stooping and may if desired be provided at its upper end with an ordinary hand hold 15.

The use of the dust pan will be fully apparent from the above description taken in connection with the drawings, it being understood that in the dumping operation the receptacle from the positions shown in Fig. 2 is placed with the end wall of the receptacle resting upon any support after which the handle 9 is operated to tilt the dust pan in the direction of the arrow. This is conveniently accomplished by reason of the fact that the pivot connection of the handle to the dust pan is near the bottom wall of the receptacle, as will be understood. In thus tilting the receptacle it will be noted that the additional length of the bottom wall acts to protect the clothing and face of the operator against dust rising during the dumping operation, as by reason of the greater length of the bottom wall the latter will in part overlie the discharge edge of the top wall and thereby direct the dust away from the clothing and face of the operator. The material of which the various parts may be constructed is not important as I contemplate the use of any serviceable material for the purpose.

Having thus described the invention what is claimed as new, is:

A dust pan comprising a receptacle including side walls having their forward edges outwardly turned to provide lips, and a handle pivotally mounted in the lips below the central point thereof.

In testimony whereof I affix my signature in presence of two witnesses.

THOMAS C. MORRIS.

Witnesses:
 FRANK P. FATU,
 THOMAS A. COFFEE.